US011100885B2

(12) United States Patent
He

(10) Patent No.: US 11,100,885 B2
(45) Date of Patent: Aug. 24, 2021

(54) DRIVING DEVICE THAT MONITORS A DIFFERENCE BETWEEN A DATA SIGNAL AND A COMMON VOLTAGE SIGNAL AND DISPLAY DEVICE

(71) Applicant: HKC CORPORATION LIMITED, Guangdong (CN)

(72) Inventor: Huailiang He, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 17/252,742

(22) PCT Filed: Dec. 10, 2018

(86) PCT No.: PCT/CN2018/119997
§ 371 (c)(1),
(2) Date: Dec. 16, 2020

(87) PCT Pub. No.: WO2020/113594
PCT Pub. Date: Jun. 11, 2020

(65) Prior Publication Data

US 2021/0118400 A1 Apr. 22, 2021

(30) Foreign Application Priority Data

Dec. 4, 2018 (CN) ........................ 201811474136.0

(51) Int. Cl.
*G06F 3/038* (2013.01)
*G09G 5/00* (2006.01)
(Continued)

(52) U.S. Cl.
CPC ......... *G09G 3/3696* (2013.01); *G09G 3/2092* (2013.01); *G09G 3/3677* (2013.01); *G09G 3/3688* (2013.01); *G09G 2310/08* (2013.01)

(58) Field of Classification Search
None
See application file for complete search history.

(56) References Cited

U.S. PATENT DOCUMENTS 7,705,840 B2 4/2010 Wei et al.
2006/0152462 A1 * 7/2006 Furihata .............. G09G 3/3655 345/98

(Continued)

FOREIGN PATENT DOCUMENTS

CN 1804988 A 7/2006
CN 106231210 A 12/2016

(Continued)

OTHER PUBLICATIONS

First Office Action in counterpart Chinese Application No. 201811474136.0, dated Nov. 19, 2019.

(Continued)

*Primary Examiner* — Kirk W Hermann

(57) ABSTRACT

The driving device includes: a common voltage drive, a source drive, a gate drive, and a control circuit including a sub-control circuit electrically connected to the common voltage drive and the source drive, and a first switch electrically connected to the sub-control circuit and the gate drive. The sub-control circuit controls the first switch to turn off the gate drive to transmit the scan signal to the display panel after the driving device is powered on; and controls the first switch to turn on the gate drive to transmit the scan signal to the display panel when the difference between the data signal and the common voltage signal reaches a pre-determined difference.

20 Claims, 9 Drawing Sheets

(51) Int. Cl.
*G09G 3/36* (2006.01)
*G09G 3/20* (2006.01)

(56) References Cited

U.S. PATENT DOCUMENTS

2012/0133626 A1 5/2012 Chung et al.
2018/0336863 A1* 11/2018 Zhang .................. G09G 3/3655

FOREIGN PATENT DOCUMENTS

CN 107633832 A 1/2018
CN 109410865 A 3/2019

OTHER PUBLICATIONS

International Search Report in corresponding PCT Application No. PCT/CN2018/119997, dated Sep. 10, 2019.
Written Opinion of the International Searching Authority in corresponding PCT Application No. PCT/CN2018/119997, dated Sep. 10, 2019.

* cited by examiner

DRIVING DEVICE THAT MONITORS A DIFFERENCE BETWEEN A DATA SIGNAL AND A COMMON VOLTAGE SIGNAL AND DISPLAY DEVICE

CROSS-REFERENCE TO RELATED APPLICATIONS

This application is a National Stage of International Application No. PCT/CN2018/119997, filed on Dec. 10, 2018, which claims priority to Chinese Application No. 201811474136.0, filed on Dec. 4, 2018 and entitled "DRIVING DEVICE AND DISPLAY DEVICE", the entire disclosure of which is incorporated herein by reference.

TECHNICAL FIELD

The present disclosure relates to the technical field of displays, in particular to a driving device and a display device.

BACKGROUND

The statements here only provide background information related to the present disclosure, and do not necessarily constitute related art.

With the development of display technology, various types of display devices have enriched people's production and life. The display panel of the display device usually includes a plurality of sub-pixels. Each sub-pixel realizes display through the voltage difference generated by different voltages on the common electrode and the pixel electrode.

The voltage on the common electrode is usually determined by the common voltage signal output by the Gamma drive (a common voltage drive), and the voltage on the pixel electrode is usually determined by the data signal output by the source drive. After the display device is powered on, the source drive needs to be reset to clear some residual information stored during the previous display operation. Therefore, the data signal output by the source drive is usually later than the common voltage signal output by the Gamma drive. This results in that after the voltage on the common electrode reaches the predetermined voltage, the voltage on the pixel electrode may still be 0V and not rise to the predetermined voltage. At this time, the display device will have abnormal flashing problems.

SUMMARY

According to various embodiments of the present disclosure, a driving device and a display device that can improve the problem of abnormal flashing are provided.

The present disclosure provides a driving device for driving a display panel, including:

a common voltage drive for outputting a common voltage signal;

a source drive for outputting a data signal;

a gate drive for outputting a scan signal;

a control circuit including a sub-control circuit and a first switch electrically connected to each other; the sub-control circuit electrically connected to the common voltage drive and the source drive, and the sub-control circuit for monitoring a difference between the data signal and the common voltage signal and controlling the first switch according to a monitoring result; the first switch electrically connected to the gate drive;

the sub-control circuit controls the first switch to be turned off to turn off the gate drive to transmit the scan signal to the display panel after the driving device is powered on; and controls the first switch to be turned on to turn on the gate drive to transmit the scan signal to the display panel when the difference between the data signal and the common voltage signal reaches a predetermined difference.

The details of one or more embodiments of the present disclosure are set forth in the following drawings and description. Other features, purposes and advantages of the present disclosure will become apparent from the description, drawings and claims.

The present disclosure further provides a display device, including a display panel and a driving device for driving the display panel. The driving device includes: a common voltage drive for outputting a common voltage signal; a source drive for outputting a data signal; a gate drive for outputting a scan signal; a control circuit including a sub-control circuit and a first switch electrically connected to each other; the sub-control circuit electrically connected to the common voltage drive and the source drive, and the sub-control circuit for monitoring a difference between the data signal and the common voltage signal and controlling the first switch according to a monitoring result; the first switch electrically connected to the gate drive;

the sub-control circuit controls the first switch to be turned off to turn off the gate drive to transmit the scan signal to the display panel after the driving device is powered on; and controls the first switch to be turned on to turn on the gate drive to transmit the scan signal to the display panel when the difference between the data signal and the common voltage signal reaches a predetermined difference;

the display panel includes a sub-pixel, and the sub-pixel includes a pixel electrode, a common electrode, and liquid crystal molecules between the pixel electrode and the common electrode; the pixel electrode is electrically connected to the source drive and receives the data signal, and the common electrode is electrically connected to the common voltage drive and receives the common voltage signal.

DETAILED DESCRIPTION OF THE EMBODIMENTS

In order to make the purpose, technical solutions, and advantages of the present disclosure clearer, the following further describes the present disclosure in detail with reference to the accompanying drawings and embodiments. It should be understood that the specific embodiments described herein are only used to explain the present disclosure, and not used to limit the present disclosure.

The driving device provided by the present disclosure can be applied to but not limited to the driving of liquid crystal display devices. Here, a liquid crystal display device is taken as an example for description.

Figure 1:
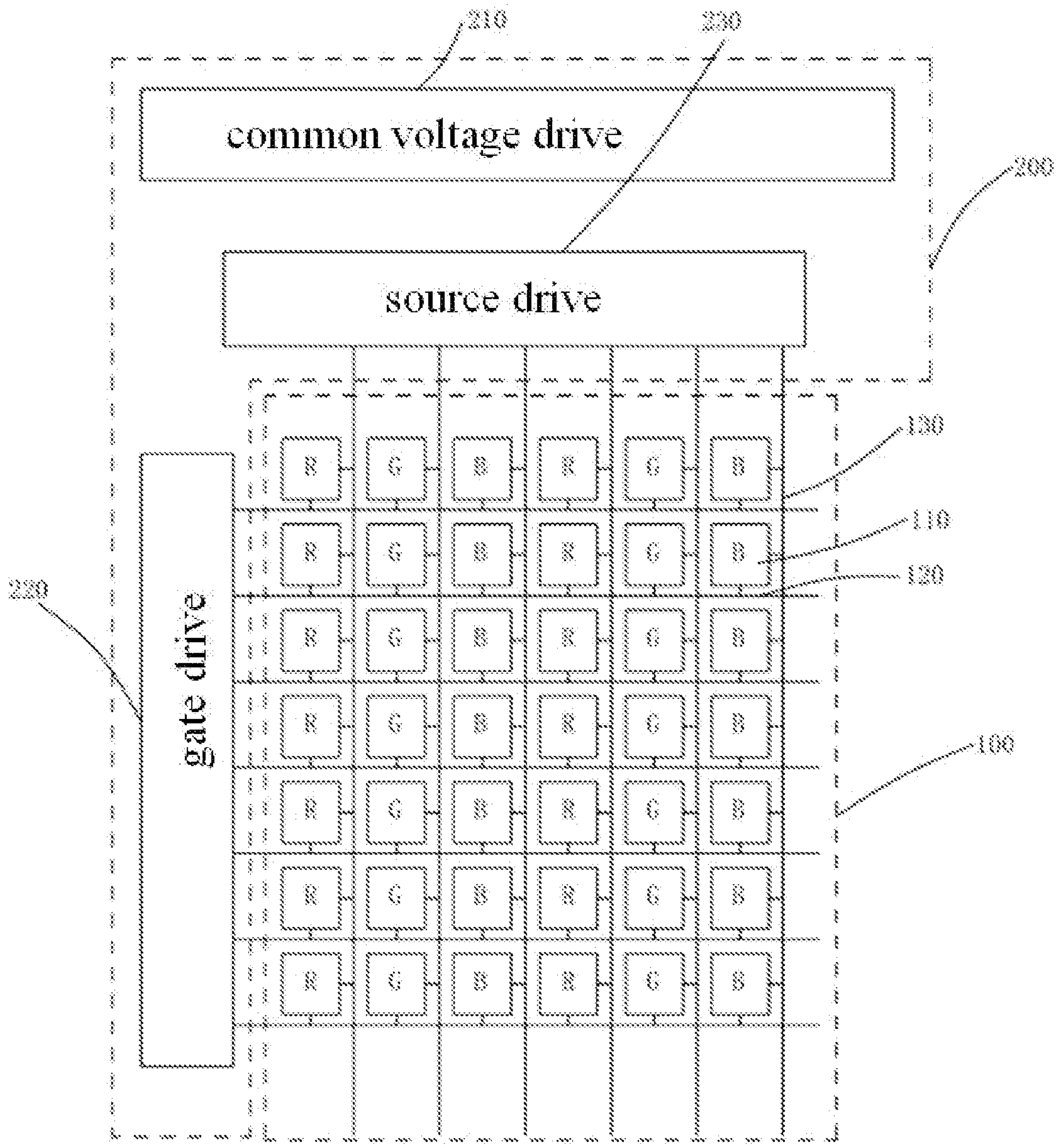
FIG. 1 is a schematic diagram of a display device in a related art.

As shown in FIG. 1, the liquid crystal display device generally includes a display panel 100 and a driving device 200 for driving the display panel 100.

Figure 2:
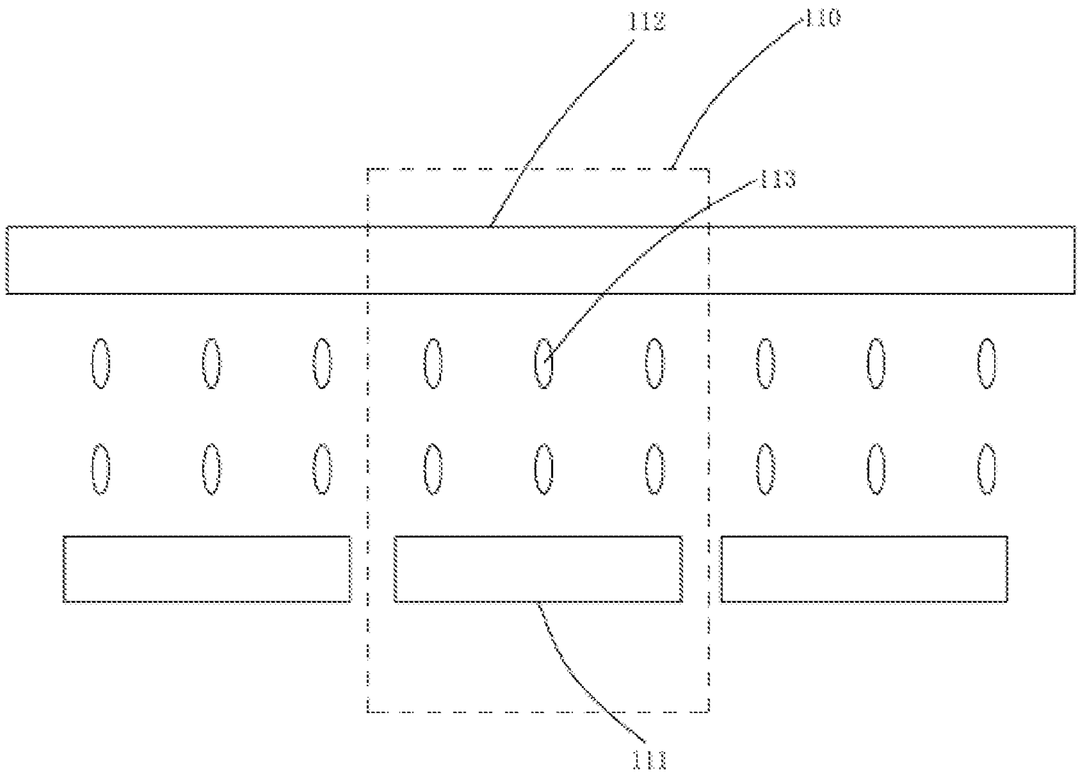
FIG. 2 is a schematic diagram of sub-pixels in a related art.

The display panel 100 generally includes sub-pixels 110 with different colors, such as a red sub-pixel R, a green sub-pixel G, and a blue sub-pixel B. The sub-pixels 110 with different colors can form a display circuit. The sub-pixels 110 with various colors in a display circuit cooperate, so that the display circuit can display any desired color. Meanwhile, all sub-pixels 110 of the display panel are orderly arranged in multiple rows, and the number of sub-pixels 110 in each row is multiple. As shown in FIG. 2, the sub-pixel 110 may include a pixel electrode 111, a common electrode 112, and liquid crystal molecules 113 between the pixel electrode 111 and the common electrode 112.

The display panel 100 usually further includes a scan line 120 and a data line 130. When the display panel is working, the scan line 120 receives a scan signal Vscan from the driving device 200, and then turns on each sub-pixel 110 row by row. At the same time, the data line 130 receives a data signal Vdata on the driving device 200, and then charges the pixel electrode 111 of each sub-pixel 110 while the sub-pixels 110 in each row are turned on. While the pixel electrode 111 receives the data signal Vdata, the common electrode 112 receives a common voltage signal Vcom on the driving device 200, thereby generating a voltage difference between the pixel electrode 111 and the common electrode 112, so that the liquid crystal molecules 113 are deflected and displayed.

Figure 3:
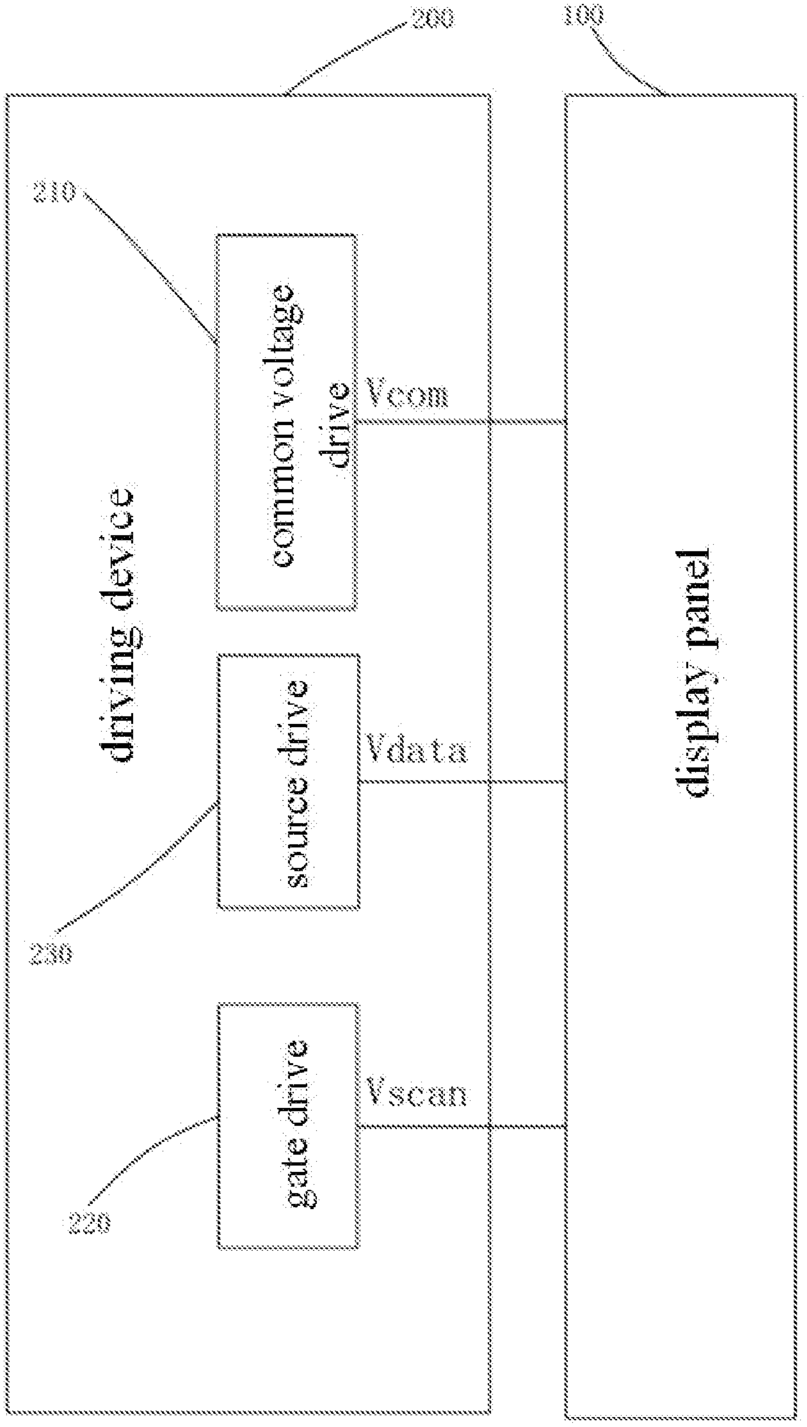
FIG. 3 is a schematic diagram of a driving device in a related art.

As shown in FIG. 3, the driving device 200 generally includes a common voltage drive 210, a gate drive 220, and a source drive 230. The common voltage drive 210 is generally a Gamma drive for outputting the common voltage signal Vcom. The gate drive 220 outputs the scan signal Vscan, and the source drive 230 outputs the data signal Vdata. When the display device is powered on to be in a working status, the common voltage drive 210, the gate drive 220, and the source drive 230 usually receive the work signal at the same time.

The common voltage drive 210 usually directly outputs the common voltage signal Vcom to the common electrode 112 after receiving the working signal. However, a reset process is required in the gate drive 220 to clear some residual information stored during the previous display operation, and then the scan signal Vscan is output. Similarly, the source drive 230 also needs to perform a reset process to clear some residual information stored during the previous display operation, and then the data signal Vdata is output. Therefore, the scan signal Vscan and the data signal Vdata are usually later than the common voltage signal Vcom.

Besides, since the internal circuit structure and the information to be cleared are not the same, the time for the reset process in the gate drive 220 is not necessarily the same as the time for the reset process in the source drive 230, that is, the timing of the output of the scan signal Vscan is not necessarily the same as the timing of the output of the data signal Vdata.

When the scan signal Vscan is earlier than the data signal Vdata, that is, the driving device 200 sequentially outputs the common voltage signal Vcom, the scan signal Vscan, and the data signal Vdata. This will result in that when the scan signal Vscan turns on the sub-pixels 110 of the display panel 100, the common voltage signal Vcom has been received on the common electrode 112 and reaches a predetermined voltage, but there is no data signal Vdata on the pixel electrode 111 that can be received, resulting in the voltage on the pixel electrode 111 being 0V instead of a predetermined voltage. This results in an abnormal voltage difference between the pixel electrode 111 and the common electrode 112, in turn causing abnormal flashing.

In order to solve the above flashing problem, the present disclosure provides a driving device and a display device.

In an embodiment, a display device is provided, including a display panel 100 and a driving device 200 for driving the display panel. The display panel 100 includes sub-pixels 110. The sub-pixel 110 includes a pixel electrode 111, a common electrode 112, and liquid crystal molecules 113 between the pixel electrode 111 and the common electrode 112. The pixel electrode 111 is electrically connected to the source drive 230 and receives a data signal Vdata, and the common electrode 112 is electrically connected to the common voltage drive 210 and receives a common voltage signal Vcom.

Figure 4:
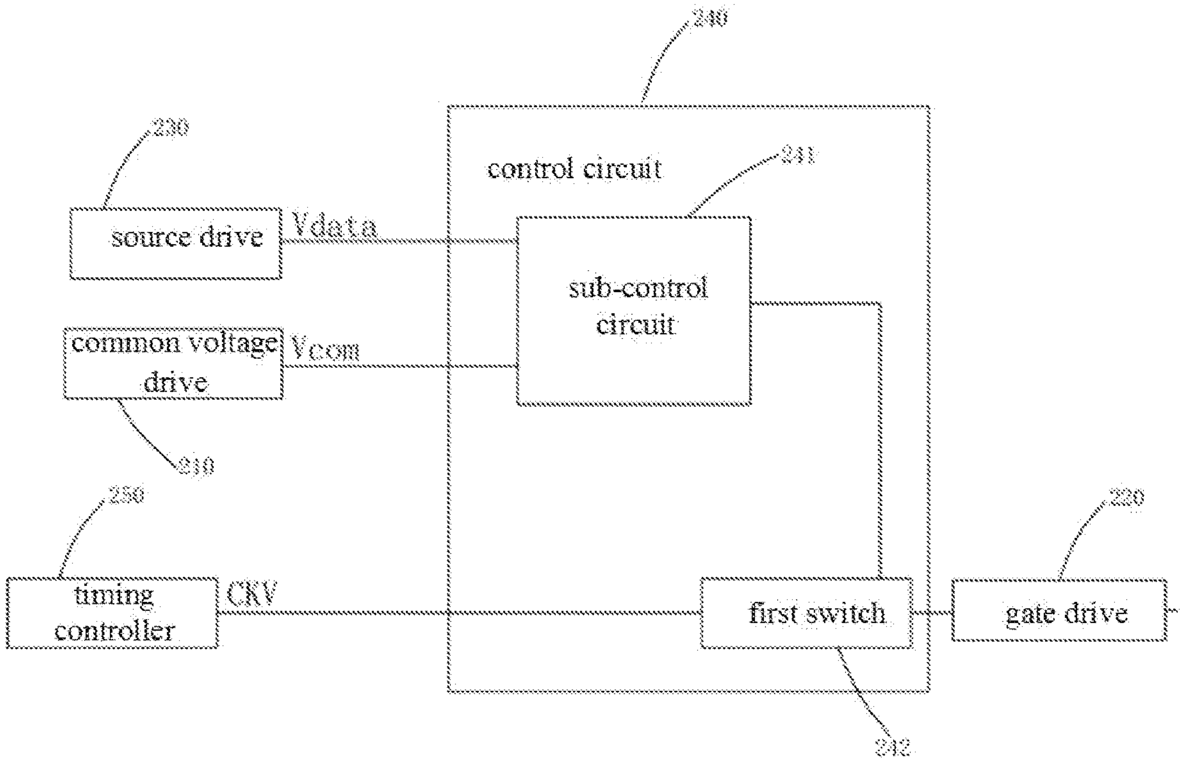
FIG. 4, FIG. 6, and FIG. 7 are schematic diagrams of driving devices according to some embodiments of the present disclosure.

In an embodiment, as shown in FIG. 4, the driving device 200 includes a common voltage drive 210, a gate drive 220, and a source drive 230. The common voltage drive 210 outputs a common voltage signal Vcom, the gate drive 220 outputs a scan signal Vscan, and the source drive 230 outputs a data signal Vdata.

Besides, the driving device 200 further includes a control circuit 240. The control circuit 240 includes a sub-control circuit 241 and a first switch 242 electrically connected to each other. The sub-control circuit 241 is electrically connected to the common voltage drive 210 and the source drive 230, and monitors a difference between the data signal Vdata and the common voltage signal Vcom and controls the first switch 242 according to the monitoring result. The first switch 241 is electrically connected to the gate drive 220. The control circuit 240 may be located in the source drive 230, or may be located in the gate drive 220, or may be located in the common voltage drive 210, or may be located in other positions of the driving device, which is not limited in the present disclosure.

After the driving device is powered on, the sub-control circuit 241 controls the first switch 242 to turn off, so as to turn off the gate drive 220 to transmit the scan signal Vscan to the display panel 100. During a period of power-on, each sub-pixel 110 on the display panel 100 does not receive the scan signal Vscan and will not turn on. Therefore, the display panel will not be displayed, thereby there will be no display abnormalities.

When the difference between the data signal Vdata and the common voltage signal Vcom reaches a predetermined difference, the sub-control circuit 241 controls the first switch 242 to turn on the gate drive 220 to transmit the scan signal Vscan to the display panel 100. The predetermined difference is a difference between the data signal Vdata and the common voltage signal Vcom, the difference reaches the value required for the product to not flashing, and the predetermined difference is no less than −2V and no greater than 2V. Therefore, when the difference between the data signal Vdata and the common voltage signal Vcom reaches the predetermined difference, the data signal Vdata has reached a level close to the common voltage signal Vcom.

At this time, each sub-pixel 110 on the display panel 100 receives the scan signal Vscan due to the first switch 242 being turned on, and after being turned on, the pixel electrode can be quickly charged to be displayed normally.

Therefore, the driving device of the present disclosure effectively prevents the abnormal flashing problem caused by the excessive difference between the data signal Vdata output by the source drive 230 and the common voltage signal Vcom output by the common voltage drive at the beginning.

Figure 5:
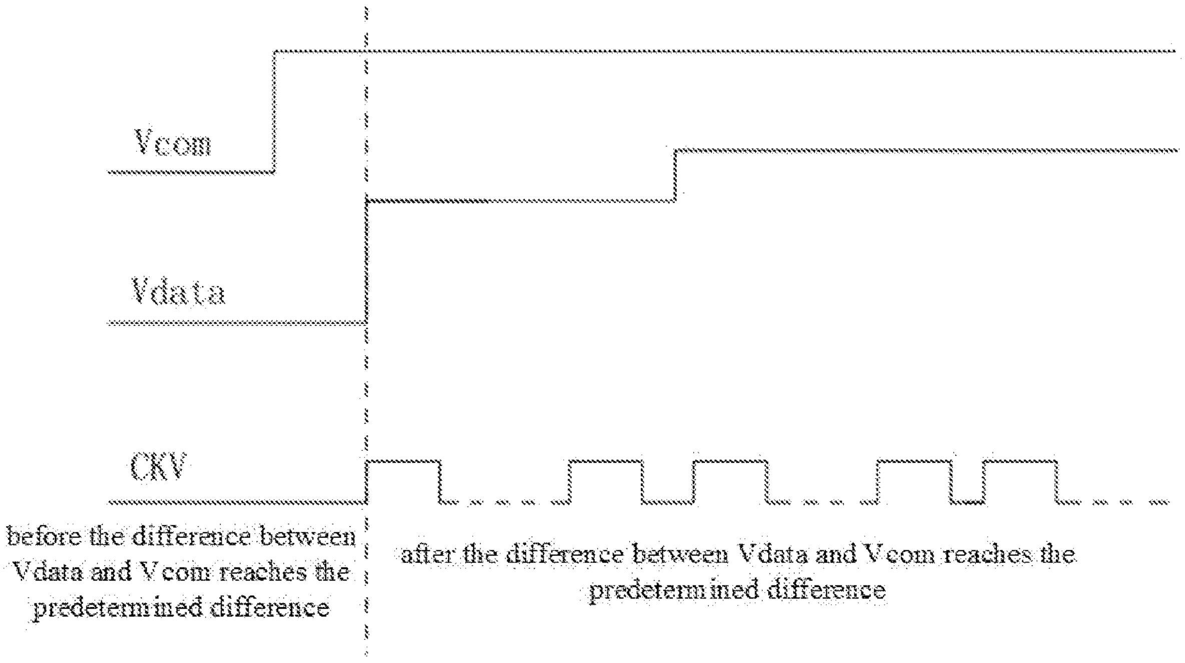
FIG. 5 is a timing diagram of various signals output by a driving device according to an embodiment of the present disclosure.

As shown in FIG. 4, in an embodiment, the driving device 200 further includes a timing controller 250. The first switch 242 is located between the timing controller 250 and the gate drive 220 and is electrically connected to the timing controller 250 and the gate drive 220. The gate drive 220 receives the pixel clock signal (CKV signal) from the timing controller 250 before outputting the scan signal Vscan to the sub-pixel 110. When the gate drive 220 outputs the scan signal Vscan for each row of sub-pixels 110, an output terminal is provided corresponding to each row. The gate drive 220 only needs one input terminal to receive the CKV signal of the timing controller 250. Therefore, the first switch 242 is provided between the timing controller 250 and the gate drive 220, such that one switch 242 can control the gate drive 220 not to receive the CKV signal and not output the scan signal Vscan, thereby turning off the gate drive 220 to transmit the scan signal Vscan to the display panel 100. At this time, the timing diagram of the data signal Vdata, the common voltage signal Vcom, and the CKV signal output by the driving device 200 is shown in FIG. 5.

In other embodiments of the present disclosure, the first switch 242 may also be provided between the gate drive 220 and the display panel 100. Although the gate drive 220 can receive the CKV signal, and output the scan signal Vscan, the scan signal Vscan cannot be transmitted to the display panel 100 due to the first switch 242 to be turned off, thereby turning off the gate drive 220 to transmit the scan signal Vscan to the display panel 100.

Figure 6:
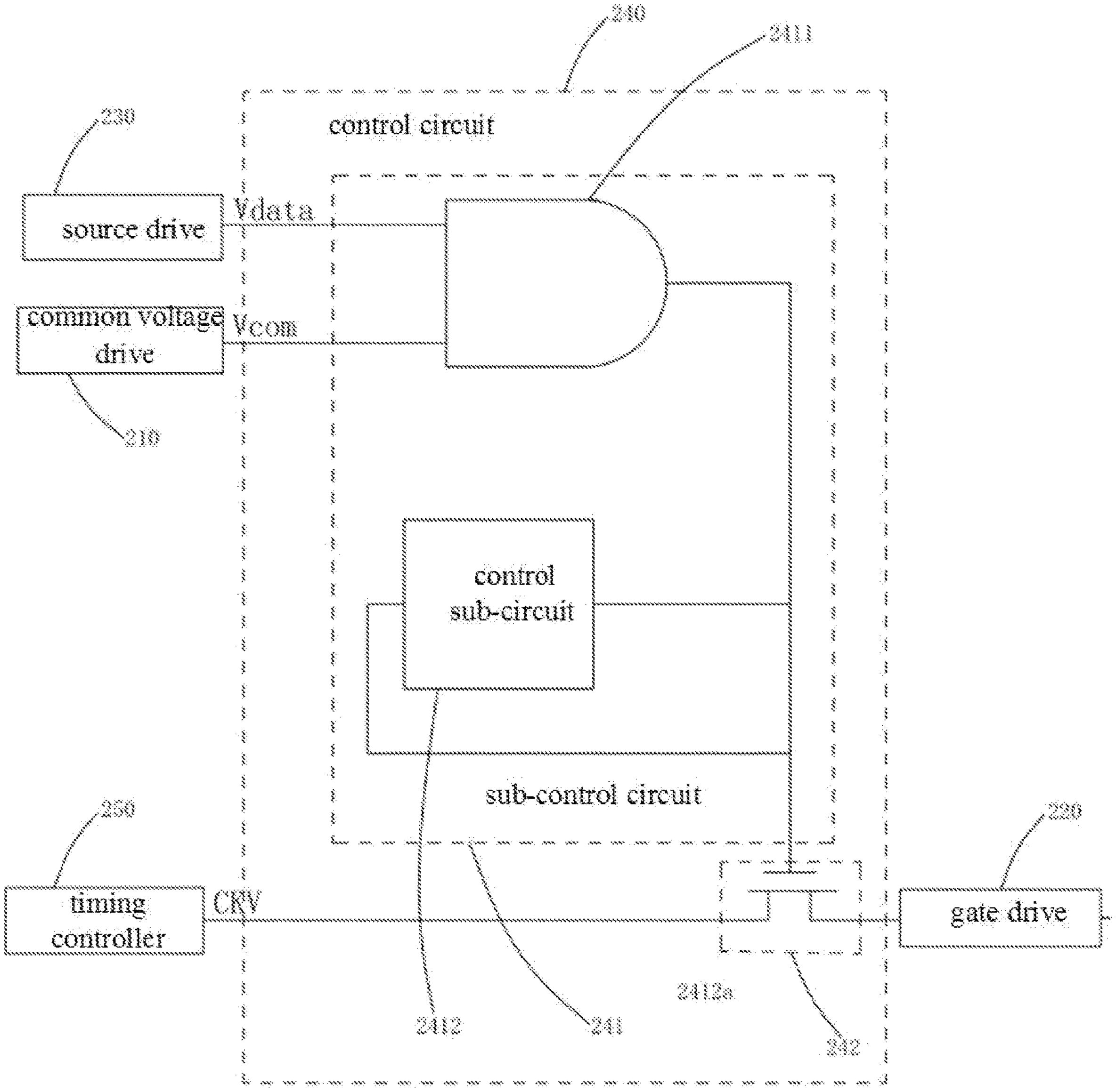
Figure 7:
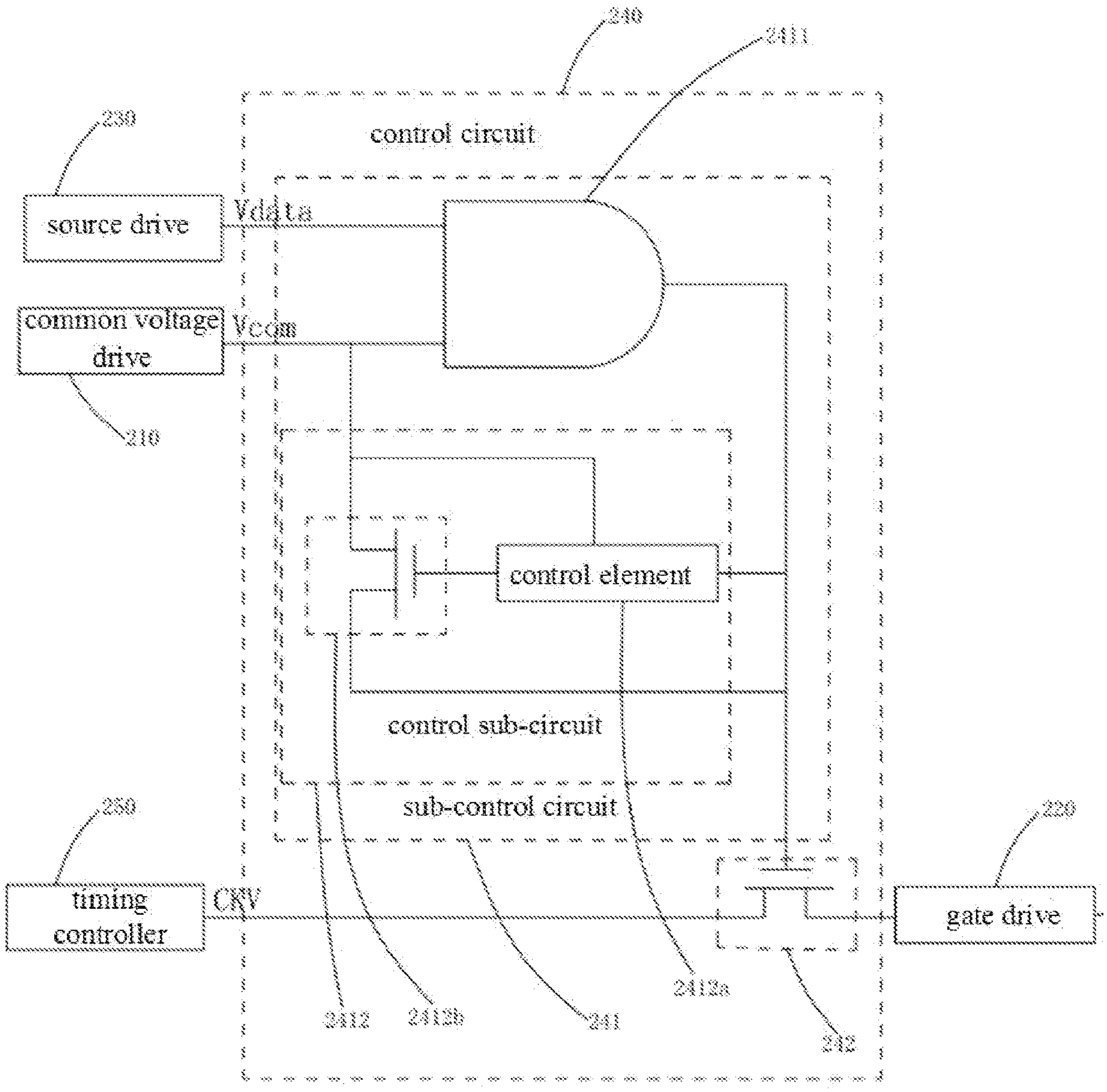

As shown in FIG. 6, in an embodiment, the sub-control circuit 241 includes an AND gate 2411 and a control sub-circuit 2412. An input terminal of the AND gate 2411 is electrically connected to the common voltage drive 210 and the source drive 230. An output terminal of the AND gate 2411 is electrically connected to the control sub-circuit 2412. Therefore, the control sub-circuit 2412 can monitor the voltage at the output terminal of the AND gate 2411. Whether the output terminal of the AND gate 2411 outputs a high-level signal depends on whether the common voltage signal Vcom output by the common voltage drive 210 and the data signal Vdata output by the source drive 230 are consistent (whether they both meet a voltage condition). Therefore, the monitoring of the voltage at the output terminal of the AND gate 2411 by the control sub-circuit 2412 also facilitates the monitoring of the data signal Vdata.

Figure 9:
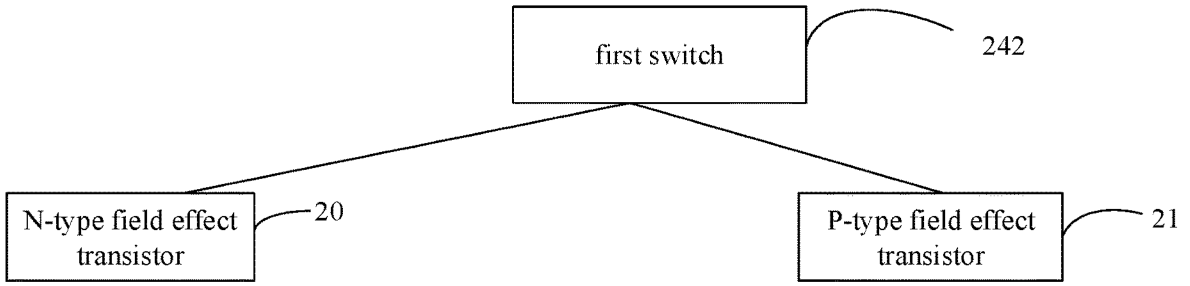
FIG. 9 is a schematic diagram of a first switch according to an embodiment of the present disclosure.

The output terminals of the control sub-circuit 2412 and the AND gate 2411 are both electrically connected to the first switch 242, and the first switch 242 can be controlled according to the monitoring result. Since the data signal Vdata is later than the common voltage signal Vcom, within a period of time after the driving device is powered on, the data signal Vdata is not output or fails to be output to a voltage value close to the common voltage signal Vcom. The common voltage signal Vcom and the data signal Vdata cannot both reach the voltage condition of the AND gate 2411 at the same time, so the AND gate 2411 is turned off. The first switch 242 may be a switch that is turned off when the AND gate 2411 is turned off. Specifically, as shown in FIG. 9, the first switch 242 may be, but is not limited to, an N-type field effect transistor 20. When the AND gate is turned off, a low level is output, which can turn off the N-type field effect transistor. Therefore, when the AND gate 2411 is turned off, the first switch 242 is turned off. Of course, when the sub-control circuit has other forms, as shown in FIG. 9, the first switch 242 may also be other three-terminal switch devices (such as P-type field effect transistors 21), may also be a non-three-terminal (for example, four-terminal) switch device, which is not limited in the present disclosure.

When the difference between the data signal Vdata and the common voltage signal Vcom reaches the predetermined difference, the common voltage signal Vcom and the data signal Vdata both reach the voltage condition of the AND gate 2411, and the AND gate 2411 is turned on and outputs the first voltage (high level voltage). After monitoring the first voltage, the control sub-circuit 2412 outputs the second voltage, so that the first switch 242 is continuously turned on after the difference between the data signal Vdata and the common voltage signal Vcom reaches the predetermined difference. The second voltage is a voltage at which the second switch 242 can be turned on.

As shown in FIG. 6, in an embodiment, the output terminal of the AND gate 2411 is electrically connected to the first switch 242, and the first switch 242 is turned on by the first voltage. Therefore, when the AND gate 2411 is turned off, the first switch 242 is turned off, and when the AND gate 2411 is turned on, the first switch 242 is turned on. At this time, the output voltage of the AND gate 2411 can be used as a reference for monitoring and control of the control sub-circuit 2412 on one hand, and can also be used as the voltage of turning on the first switch 242 on the other hand.

The control sub-circuit 2412 can be set to start timing after monitoring the first voltage. Before the counting reaches a predetermined time, the first switch 242 is controlled to be turned on by the first voltage. After the timing reaches the predetermined time, the control sub-circuit 2415 outputs the second voltage to control the first switch 242 to be continuously turned on.

Figure 8:
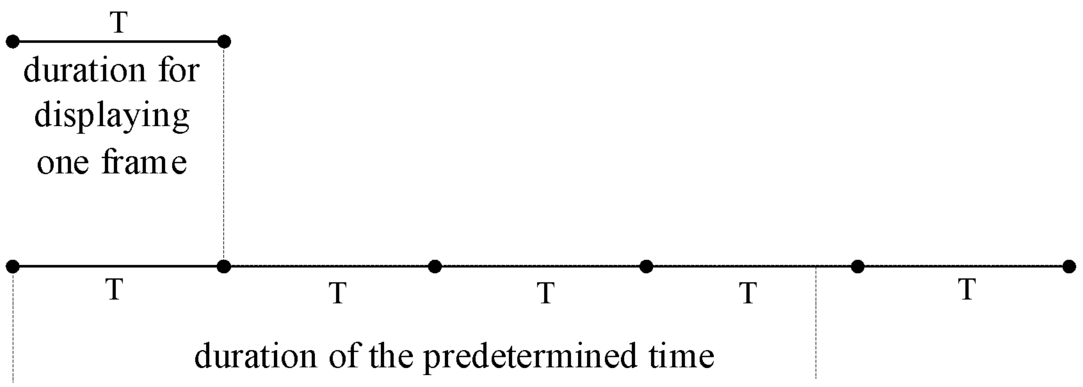
FIG. 8 is a schematic diagram of a duration according to an embodiment of the present disclosure.

The first switch 242 is controlled to be turned on by the first voltage within a predetermined time, and it is required that the voltage value of the data signal Vdata is always close to the voltage value of the common voltage signal Vcom during this period of time. The first switch 242 is turned on, the sub-pixel 110 receives the scan signal Vscan and is turned on, and the data signal Vdata charges the pixel electrode 111. Therefore, the voltage on the pixel electrode 111 is also close to the electrode on the common electrode 112, and when the driving device is powered on, the arrangement direction of the liquid crystal molecules 113 in the sub-pixel 110 is sorted to remove the influence of the previous display on the arrangement direction of the liquid crystal molecules 113, so that the subsequent display effect is better. As shown in FIG. 8, the duration for displaying one frame is set as T, and the duration of the predetermined time is not greater than 5T. At this time, the arrangement direction of the liquid crystal molecules 113 can be effectively sorted, and the blackened surface before display will not be too long, which will affect the display effect.

In an embodiment of the present disclosure, the duration of the predetermined time counted by the control sub-circuit 2412 may also be different from the duration for arranging the liquid crystal molecules 113 with the voltage value of the data signal Vdata close to the voltage value of the common voltage signal Vcom. For example, the duration for arranging the liquid crystal molecules 113 is 5T (that is, the duration of five frames), and the duration of the predetermined time is 1T (that is, the duration of one frame).

Alternatively, in an embodiment of the present disclosure, the control sub-circuit 2412 may not perform timing, but directly output the second voltage after it monitors the first voltage, such that the first switch 242 is continuously turned on after the difference between the data signal Vdata and the common voltage signal Vcom reaches a predetermined difference. The output terminal of the AND gate 2411 may not be electrically connected to the first switch 242. Before the difference between the data signal Vdata and the common voltage signal Vcom reaches a predetermined difference, the control sub-circuit 2412 does not monitor the first voltage, and can control the first switch 242 to turn off according to this information. Then, after the difference between the data signal Vdata and the common voltage signal Vcom reaches a predetermined difference, the control sub-circuit 2412 monitors the first voltage, and then directly outputs the second voltage, such that the first switch 242 is continuously turned on after the difference between the data signal Vdata and the common voltage signal Vcom reaches a predetermined difference.

Referring to the figures, in an embodiment, the control sub-circuit 2412 may further include a control element **2412*a* and a second switch 2412*b* electrically connected to each other. The control element 2412*a* is also electrically connected to the output terminal of the AND gate 2411, and monitors the voltage at the output terminal of the AND gate 2411. The second switch 2412*b* is also electrically connected to the first switch 241 and the common voltage drive 210**.

Figure 10:
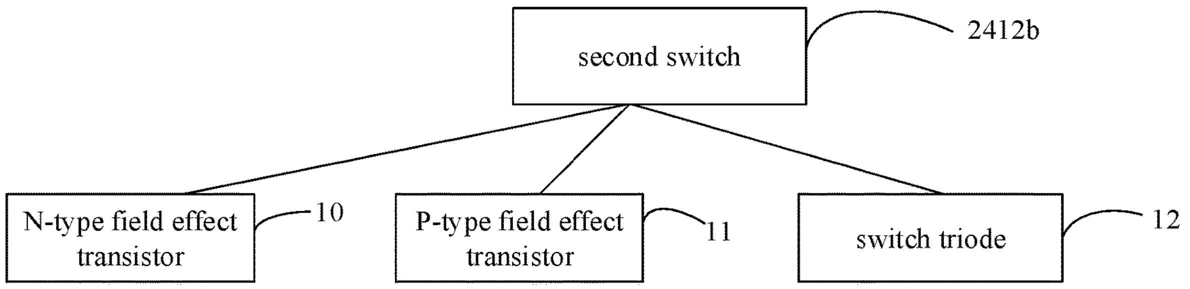
FIG. 10 is a schematic diagram of a second switch according to an embodiment of the present disclosure.

Before the control element **2412*a* monitors the first voltage, the second switch 2412*b* is turned off. After the control element 2412*a* monitors the first voltage, a second voltage is output to turn on the second switch 2412*b*, so that the common voltage signal Vcom of the common voltage drive 210 is transmitted to the first switch 241 to turn on the first switch. The second switch 2412*b* may specifically be a three-terminal switch device. For example, as shown in FIG. 10, the second switch 2412*b* may be an N-type field effect transistor 10 or a P-type field effect transistor 11. The turning on/off of the first switch 241 can be controlled by the common voltage signal Vcom on the common voltage drive 210. Of course, in other forms of control circuits, as shown in FIG. 10, the second switch 2412*b* may also be a switch triode 12** or other non-three-terminal switch device, which is not limited in the present disclosure.

Referring to the figures, in an embodiment of the present disclosure, the second switch **2412*b* may not be provided, but the second voltage output by the control element 2412*a* (control sub-circuit 2412) directly controls the first switch 241**, so as to make the circuit more concise.

In an embodiment, the control element **2412*a* is also electrically connected to the common voltage drive 210. After the control element 2412*a* monitors the common voltage signal Vcom, a third voltage is output to turn off the second switch 2412*b*, and then the off state of the second switch 2412*b* is controlled by the third voltage. At the same time, the control element 2412*a* is also electrically connected to the common voltage drive 210, so that the control element 2412*a* can output the third voltage after monitoring the common voltage signal Vcom, thereby facilitating the timing control of the control element 2412*a***.

In an embodiment, the driving device also includes a timing controller 250. The timing controller 250 is electrically connected to the common voltage drive 210 and the control element **2412*a*. Therefore, the timing controller 250 can transmit a working signal to the common voltage drive 210, so that it performs the output of the common voltage signal Vcom, the control element 2412*a* outputs the third voltage to turn off the second switch 2412*b*, thereby providing timing control for the control element 2412*a***.

Referring to the figures, in an embodiment, the driving device 200 includes a common voltage drive 210, a gate drive 220, a source drive 230, and a control circuit 240. The common voltage drive 210 outputs a common voltage signal Vcom, the gate drive 220 outputs a scan signal Vscan, and the source drive 230 outputs a data signal Vdata.

The control circuit 240 includes a sub-control circuit 241 and a first switch 242. The sub-control circuit 241 includes an AND gate 2411 and a control sub-circuit 2412. The control sub-circuit 2412 includes a control element **2412*a* and a second switch 2412*b* that are electrically connected to each other. The first switch 241 is electrically connected to the gate drive 220. An input terminal of the AND gate 2411 is electrically connected to the common voltage drive 210 and the source drive 230. An output terminal of the AND gate 2411 is electrically connected to the control element 2412*a* and the first switch 242. The second switch 2412*b* is also electrically connected to the first switch 242 and the common voltage drive 210**.

After the driving device is powered on, the AND gate 2411 is turned off, and the first switch 242 is turned off to turn off the gate driving 220 to transmit the scan signal Vscan to the display panel 100. When the difference between the data signal Vdata and the common voltage signal Vcom reaches the predetermined difference, the AND gate 2411 is turned on and outputs the first voltage, the predetermined difference is no less than −2V and no greater than 2V. The control element **2412*a* monitors the voltage at the output terminal of the AND gate 2411. Before the control element 2412*a* monitors the first voltage, the second switch 2412*b* is turned off. After the control element 2412*a* monitors the first voltage, it starts timing. Before the timing reaches a duration for displaying one frame, the first voltage controls the first switch 242 to be turned on. After the timing reaches the predetermined time, the control element 2412*a* outputs the second voltage to turn on the second switch 2412*b*, so that the common voltage signal Vcom of the common voltage drive 210 is transmitted to the first switch 242 to continuously turn on the first switch 242**.

In this embodiment, the sub-control circuit 241 controls the first switch 242 to be turned off to turn off the gate drive 220 to transmit the scan signal Vscan to the display panel 100. When the difference between the data signal Vdata and the common voltage signal Vcom reaches a predetermined difference, the sub-control circuit 241 controls the first switch 242 to be turned on to turn on the gate drive 220 to transmit the scan signal Vscan to the display panel 100, which can effectively prevent the abnormal flashing during startup.

The technical features of the above embodiments can be combined arbitrarily. In order to make the description concise, all possible combinations of the technical features in the above embodiments are not described, however, as long as there is no contradiction in the combination of these technical features, it should be regarded as within the scope of this specification.

What is claimed is:

1. A driving device for driving a display panel, comprising:

a common voltage drive for outputting a common voltage signal;

a source drive for outputting a data signal;

a gate drive for outputting a scan signal; and a control circuit comprising a sub-control circuit and a first switch electrically connected to each other, the sub-control circuit electrically connected to the common voltage drive and the source drive, the sub-control circuit for monitoring a difference between the data signal and the common voltage signal and controlling the first switch according to a monitoring result, the first switch electrically connected to the gate drive;

wherein the sub-control circuit controls the first switch to be turned off to turn off the gate drive to transmit the scan signal to the display panel after the driving device is powered on; and controls the first switch to be turned on to turn on the gate drive to transmit the scan signal to the display panel when the difference between the data signal and the common voltage signal reaches a predetermined difference.

2. The driving device of claim 1, further comprising:

a timing controller for controlling output of the scan signal.

3. The driving device of claim 2, wherein the first switch is located between the timing controller and the gate drive, and is electrically connected to the timing controller and the gate drive.

4. The driving device of claim 1, wherein:

the sub-control circuit comprises an AND gate and a control sub-circuit; input terminals of the AND gate are each respectively electrically connected to one of the common voltage drive and the source drive, and an output terminal of the AND gate is electrically connected to the control sub-circuit and the first switch; the control sub-circuit monitors a voltage at the output terminal of the AND gate, and is electrically connected to the first switch;

after the driving device is powered on, the AND gate is turned off, and the first switch is turned off; the AND gate is turned on and outputs a first voltage when the difference between the data signal and the common voltage signal reaches the predetermined difference; after the control sub-circuit monitors the first voltage, a second voltage is output, the first switch is continuously turned on after the difference between the data signal and the common voltage signal reaches the predetermined difference.

5. The driving device of claim 4, wherein the first switch is turned on by the first voltage.

6. The driving device of claim 5, wherein the control sub-circuit further starts timing after monitoring the first voltage; the first switch is turned on by the first voltage before the timing reaches a predetermined time, and is controlled to be continuously on by a second voltage output from the control sub-circuit after the timing reaches a predetermined time.

7. The driving device of claim 6, wherein a duration for displaying one frame is T, and a duration of the predetermined time is not greater than 5T.

8. The driving device of claim 4, wherein:

the control sub-circuit comprises a control element and a second switch that are electrically connected to each other; the control element is electrically connected to the output terminal of the AND gate for monitoring the voltage at the output terminal of the AND gate; the second switch is electrically connected to the first switch and the common voltage drive;

before the control element monitors the first voltage, the second switch is turned off; after the control element monitors the first voltage, the second voltage is output to turn on the second switch, the common voltage signal of the common voltage drive is transmitted to the first switch to turn on the first switch.

9. The driving device of claim 8, wherein the control element is electrically connected to the common voltage drive, and outputs a third voltage to turn off the second switch after the common voltage signal is monitored.

10. The driving device of claim 8, wherein the driving device further comprises:

a timing controller electrically connected to the common voltage drive and the control element;

wherein the timing controller controls the common voltage drive to output the common voltage signal, and controls the control element to output a third voltage to turn off the second switch.

11. The driving device of claim 8, wherein the second switch is a three-terminal switch device.

12. The driving device of claim 11, wherein the second switch is an N-type field effect transistor.

13. The driving device of claim 11, wherein the second switch is a P-type field effect transistor.

14. The driving device of claim 11, wherein the second switch is a switch triode.

15. The driving device of claim 1, wherein the first switch is a three-terminal switch device.

16. The driving device of claim 15, wherein the first switch is an N-type field effect transistor.

17. The driving device of claim 15, wherein the first switch is a P-type field effect transistor.

18. The driving device of claim 1, wherein the predetermined difference is no less than −2V and no greater than 2V.

19. A driving device for driving a display panel, comprising:

a common voltage drive for outputting a common voltage signal;

a source drive for outputting a data signal;

a gate drive for outputting a scan signal;

a control circuit comprising a sub-control circuit and a first switch; the sub-control circuit comprising an AND gate and a control sub-circuit; the control sub-circuit comprising a control element and a second switch that are electrically connected to each other;

wherein the first switch is electrically connected to the gate drive, input terminals of the AND gate are each respectively electrically connected to one of the common voltage drive and the source drive, an output terminal of the AND gate is electrically connected to the control element and the first switch; the second switch is electrically connected to the first switch and the common voltage drive;

after the driving device is powered on, the AND gate is turned off, and the first switch is turned off to turn off the gate drive to transmit the scan signal to the display panel; the AND gate is turned on to output a first voltage when a difference between the data signal and the common voltage signal reaches a predetermined difference, the predetermined difference is no less than −2V and no greater than 2V;

the control element monitors a voltage at the output terminal of the AND gate; before the control element monitors the first voltage, the second switch is turned off;

the control element starts timing after monitoring the first voltage; the first switch is controlled to be turned on by the first voltage before the timing reaches a duration for displaying one frame; the control element further outputs a second voltage to turn on the second switch after the timing reaches the duration for displaying one frame, such that the common voltage signal of the common voltage drive is transmitted to the first switch to keep the first switch on.

20. A display device, comprising:

a display panel; and a driving device for driving the display panel, the driving device comprising:

a common voltage drive for outputting a common voltage signal;

a source drive for outputting a data signal;

a gate drive for outputting a scan signal;

a control circuit comprising a sub-control circuit and a first switch electrically connected to each other; the sub-control circuit electrically connected to the common voltage drive and the source drive, and the sub-control circuit for monitoring a difference between the data signal and the common voltage signal and controlling the first switch according to a monitoring result; the first switch electrically connected to the gate drive;

the sub-control circuit controls the first switch to be turned off to turn off the gate drive to transmit the scan signal to the display panel after the driving device is powered on; and controls the first switch to be turned on to turn on the gate drive to transmit the scan signal to the display panel when the difference between the data signal and the common voltage signal reaches a predetermined difference; and the display panel comprising:

a sub-pixel comprising:

a pixel electrode electrically connected to the source drive and for receiving the data signal;

a common electrode electrically connected to the common voltage drive and for receiving the common voltage signal; and liquid crystal molecules between the pixel electrode and the common electrode.

* * * * *